(12) United States Patent
Breed et al.

(10) Patent No.: US 7,525,442 B1
(45) Date of Patent: Apr. 28, 2009

(54) METHOD FOR CONTROLLING OUTPUT OF A CLASSIFICATION ALGORITHM

(75) Inventors: David S. Breed, Boonton Township, Morris County, NJ (US); Tie-Qi Chen, Windsor (CA); Ray Piirainen, Romeo, MI (US)

(73) Assignee: Automotive Technologies International, Inc., Denville, NJ (US)

( * ) Notice: Subject to any disclaimer, the term of this patent is extended or adjusted under 35 U.S.C. 154(b) by 113 days.

(21) Appl. No.: 11/364,901

(22) Filed: Feb. 27, 2006

Related U.S. Application Data

(62) Division of application No. 10/644,334, filed on Aug. 20, 2003, now Pat. No. 7,009,502.

(60) Provisional application No. 60/405,991, filed on Aug. 26, 2002.

(51) Int. Cl.
 *G08B 21/00* (2006.01)
(52) U.S. Cl. .............. 340/667; 280/735; 340/436; 340/438; 701/45
(58) Field of Classification Search ............. 340/439, 340/438, 425.5, 436, 667, 666; 701/45; 280/735, 734; 180/271; 702/127; 73/862.581
See application file for complete search history.

(56) References Cited

U.S. PATENT DOCUMENTS

| | | | |
|---|---|---|---|
| 4,957,286 A | 9/1990 | Persons, II et al. |
| 5,482,314 A | 1/1996 | Corrado |
| 5,528,698 A | 6/1996 | Kamei et al. |
| 5,653,462 A | 8/1997 | Breed |
| 5,822,707 A | 10/1998 | Breed et al. |
| 5,829,782 A | 11/1998 | Breed |
| 5,845,000 A | 12/1998 | Breed |
| 5,890,085 A | 3/1999 | Corrado |
| 5,943,295 A | 8/1999 | Varga |
| 5,983,147 A | 11/1999 | Krumm |
| 6,056,079 A | 5/2000 | Cech et al. |
| 6,078,854 A | 6/2000 | Breed et al. |
| 6,081,757 A | 6/2000 | Breed et al. |
| 6,101,436 A | 8/2000 | Fortune et al. |
| 6,246,936 B1 | 6/2001 | Murphy et al. |
| 6,252,240 B1 | 6/2001 | Gillis et al. |

(Continued)

FOREIGN PATENT DOCUMENTS

EP 0345806 12/1989

(Continued)

*Primary Examiner*—Brent Swarthout
(74) *Attorney, Agent, or Firm*—Brain Roffe

(57) ABSTRACT

Method for controlling output of a classification algorithm which classifies an occupant of a seat in a vehicle in which a bladder or other type of weight sensor is arranged in a bottom cushion of the seat, data relating to the pressure exerted by the occupant on the bottom cushion is obtained from the weight sensor, the occupant is initially classified, a current classification is output using data from the weight sensor, the occupant is periodically re-classified using data from the weight sensor, and a classification change is allowed only upon obtaining evidence of a new classification which is greater than evidence of the current classification. The classification change may be enabled by determining a substantially consecutive period of time when the re-classification is unchanged and different from the current classification, and enabling the classification change upon when the consecutive period of time is greater than a threshold.

23 Claims, 3 Drawing Sheets

U.S. PATENT DOCUMENTS

| | | |
|---|---|---|
| 6,272,411 B1 | 8/2001 | Corrado et al. |
| 6,286,861 B1 * | 9/2001 | Cech et al. .................. 280/735 |
| 6,330,501 B1 | 12/2001 | Breed |
| 6,431,592 B2 | 8/2002 | Seip |
| 6,438,477 B1 | 8/2002 | Patterson et al. |
| 6,442,504 B1 | 8/2002 | Breed et al. |
| 6,459,974 B1 | 10/2002 | Baloch et al. |
| 6,609,054 B2 | 8/2003 | Wallace |
| 6,636,792 B2 | 10/2003 | Lichtinger et al. |
| 6,801,662 B1 | 10/2004 | Owechko et al. |
| 6,808,200 B2 | 10/2004 | Drobny et al. |
| 6,859,707 B2 * | 2/2005 | Marchthaler et al. .......... 701/45 |
| 7,009,502 B2 * | 3/2006 | Breed et al. ................. 340/436 |
| 2002/0059022 A1 * | 5/2002 | Breed et al. .................... 701/45 |
| 2003/0097121 A1 | 5/2003 | Jolly et al. |
| 2003/0097212 A1 | 5/2003 | Feser |
| 2003/0154805 A1 | 8/2003 | Takafuji et al. |

FOREIGN PATENT DOCUMENTS

| | | |
|---|---|---|
| JP | 10-194079 | 7/1998 |
| WO | WO 98/30411 | 7/1998 |

* cited by examiner

METHOD FOR CONTROLLING OUTPUT OF A CLASSIFICATION ALGORITHM

CROSS-REFERENCE TO RELATED APPLICATIONS

This application is a divisional of U.S. patent application Ser. No. 10/644,334 now U.S. Pat. No. 7,009,502, filed Aug. 20, 2003 which claims priority under 35 U.S.C. §119(e) of U.S. provisional patent application Ser. No. 60/405,991 filed Aug. 26, 2002, the entire contents of which are incorporated by reference herein.

FIELD OF THE INVENTION

The present invention relates to the design, creation and use of an algorithm for controlling classification of a vehicle occupancy detection system.

BACKGROUND OF THE INVENTION

Vehicles currently include various systems whose operation depends on the occupancy of the vehicle. For example, it has been known for some time that an occupant restraint or protection device can be designed to deploy differently depending on the type of occupants to be protected by the device (see for example, U.S. Pat. No. 5,829,782 (Breed et al.)). A classification of the occupancy of the vehicle is therefore desired in order to optimize the deployment of the occupant protection device.

Moreover, it is known that the position of the occupant can also affect the operation of various systems in the vehicle, most importantly, the occupant protection device (see, for example, U.S. Pat. No. 5,653,462 (Breed et al.)). Determination of the position of the occupant is therefore desired to optimize the deployment of the occupant protection device.

Lichtinger et al. (U.S. Pat. No. 6,636,792) describe a method for controlling output of a classification algorithm having two stages, a track stage and a lock stage. In the track stage, the occupant is repeatedly classified and whatever classification is obtained is output. The track stage continues until a predetermined number of consistent and consecutive classifications are observed, at which time, that classification is locked and considered the current classification, i.e., the algorithm reaches the lock stage. During the track stage however, whenever a classification is obtained which is different from the immediately preceding classification, the count of the number of consistent and consecutive classifications also begins anew. Thus, if the number of classifications needed to lock is 20 and the same classification of an adult is returned for 15 consecutive times, and then a single different classification is obtained, the process would remain in the track stage and the process of counting consistent and consecutive classifications begun anew. The output classification during the track stage would thus be whatever the immediately obtained classification is without regard to any previous classification. This continues as long as the classification has not been returned the predetermined number of times to reach the lock stage. Occupant classification is not likely optimal in Lichtinger et al. because it discloses changing the current or output classification based only on a change between consecutive classifications (in the track stage) or relative to a pre-determined threshold (in the lock stage). During the lock stage, the threshold is invariable.

What is needed therefore is an algorithm which can optimize both the classification of the occupancy of the vehicle and the determination of the position of the occupants.

DEFINITIONS

Preferred embodiments of the invention are described below and unless specifically noted, it is the applicants' intention that the words and phrases in the specification and claims be given the ordinary and accustomed meaning to those of ordinary skill in the applicable art(s). If the applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identify of that object. A number of different objects are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult can be a different object than a normally seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to the instant invention. In the above-cited prior art, except in that assigned to the current assignee, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A pattern recognition algorithm will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized.

To "ascertain the identity of" as used herein with reference to an object will generally mean to determine the type or nature of the object (obtain information as to what the object is), i.e., that the object is an adult, an occupied rear facing child seat, an occupied front facing child seat, an unoccupied rear facing child seat, an unoccupied front facing child seat, a child, a dog, a bag of groceries, a car, a truck, a tree, a pedestrian, a deer etc.

An "object" in a vehicle or an "occupying item" of a seat may be a living occupant such as a human or a dog, another living organism such as a plant, or an inanimate object such as a box or bag of groceries or an empty child seat.

A "rear seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

An "optical image" will generally mean any type of image obtained using electromagnetic radiation including visual, infrared and radar radiation.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Out-of-position" as used for an occupant will generally mean that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance such as about 5 inches from the deployment door of the airbag module. The actual distance where airbag deployment should be suppressed depends on the design of the airbag module and is typically farther for the passenger airbag than for the driver airbag.

"Transducer" or "transceiver" as used herein will generally mean the combination of a transmitter and a receiver. In come cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), electric field, weight measuring or sensing devices. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases a pair of such plates or antennas will comprise a transducer as determined by the context in which the term is used.

"Adaptation" as used here will generally represent the method by which a particular occupant sensing system is designed and arranged for a particular vehicle model. It includes such things as the process by which the number, kind and location of various transducers is determined. For pattern recognition systems, it includes the process by which the pattern recognition system is designed and then taught or made to recognize the desired patterns. In this connection, it will usually include (1) the method of training when training is used, (2) the makeup of the databases used, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle to create the system that accurately identifies and/or determines the location of an occupant or other object in a vehicle.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data.

A "morphological characteristic" will generally mean any measurable property of a human such as height, weight, leg or arm length, head diameter, skin color or pattern, blood vessel pattern, voice pattern, finger prints, iris patterns, etc.

A "wave sensor" or "wave transducer" is generally any device which senses either ultrasonic or electromagnetic waves. An electromagnetic wave sensor, for example, includes devices that sense any portion of the electromagnetic spectrum from ultraviolet down to a few hertz. The most commonly used kinds of electromagnetic wave sensors include CCD and CMOS arrays for sensing visible and/or infrared waves, millimeter wave and microwave radar, and capacitive or electric and/or magnetic field monitoring sensors that rely on the dielectric constant of the object occupying a space but also rely on the time variation of the field, expressed by waves as defined below, to determine a change in state.

A "CCD" will be defined to include all devices, including CMOS arrays, APS arrays, QWIP arrays or equivalent, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit (at times designated 120 herein) containing a microprocessor for analysis of the digitized data. In order to minimize the amount of data that needs to be stored, initial processing of the image data takes place as it is being received from the CCD array, as discussed in more detail above. In some cases, some image processing can take place on the chip such as described in the Kage et al. artificial retina article referenced above.

The "windshield header" as used herein includes the space above the front windshield including the first few inches of the roof.

A "sensor" as used herein is the combination of two transducers (a transmitter and a receiver) or one transducer which can both transmit and receive. The headliner is the trim which provides the interior surface to the roof of the vehicle and the A-pillar is the roof-supporting member which is on either side of the windshield and on which the front doors are hinged.

An "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle.

With respect to the classification of objects, an "empty seat" determination can also be classified as "restraint system disable" (since the restraint system would typically be disabled for an empty seat) although the presence of a child seat can also result in a disabled restraint system (i.e., a classification of "restraint system disable"). Thus, when the classification of an "empty seat" is used below, it will also mean "restraint system disable" except where the context indicates otherwise.

OBJECTS AND SUMMARY OF THE INVENTION

It is an object of the present invention to provide a new and improved algorithm capable of providing information on occupancy of a vehicle.

It is another object of the present invention to provide a new and improved algorithm that provides information on vehicle occupancy with the occupants being classified separately from a determination of the occupant's position so that each task can be optimized independent of the other task.

It is yet another object of the present invention to provide a new classification system and method that requires increased evidence to change a classification when the time of the previous classification is increased.

Another object of the present invention is to provide a new classification system where the length of time that one classification occurs affects the length of time before the classification is permitted to change.

Yet another object of the present invention is to provide a new system to reduce toggling between classification states by requiring a minimum amount of time to pass where the new classification state occurs before changing the output of the classification system.

Still another object of the present invention is to provide a time-based classification system which is reset upon the occurrence of an event selected from the group of empty seat, door opening, vehicle ignition, vehicle motion and lack of vehicle motion.

In order to achieve at least one of these objects, a method for controlling output of a classification algorithm which classifies an occupant of a seat in a vehicle in accordance with the invention comprises arranging a bladder or other type of weight sensor in a bottom cushion of the seat, obtaining data relating to the pressure exerted by the occupant on the bottom cushion of the seat from the bladder weight sensor, initially classifying the occupant and outputting a current classification using the data from the bladder weight sensor, subsequently periodically re-classifying the occupant using the data from the bladder weight sensor, and enabling a change in the classification of the occupant only upon obtaining evidence of a new classification which is greater than evidence of the current classification.

The change in the classification of the occupant may be enabled by determining a substantially consecutive period of time when the re-classification of the occupant is unchanged and different from the current classification, and enabling a change in the classification of the occupant only upon when the consecutive period of time is greater than a threshold and then outputting the changed classification. Optionally, the classification may be reset by classifying the occupant and outputting the classification, upon detection of an empty seat as detected by the bladder weight sensor.

Another method for controlling output of a classification algorithm which classifies an occupant of a seat in a vehicle in accordance with the invention comprises arranging one or more spatial sensors to generate a field over a bottom cushion of the seat and in which the occupant is expected to be situated, obtaining data about the occupant from the spatial sensor, initially classifying the occupant and outputting a current classification using the data about the occupant from the spatial sensor, subsequently periodically re-classifying the occupant using the data about the occupant from the spatial sensor, and enabling a change in the classification of the occupant only upon obtaining evidence of a new classification which is greater than evidence of the current classification. Each spatial sensor may be a capacitance-based sensor, an electric field-based sensor, a radar or other electromagnetic wave-based sensor, and/or an ultrasonic-based sensor. A change in the classification of the occupant may entail determining a substantially consecutive period of time when the re-classification of the occupant is unchanged and different from the current classification; and enabling a change in the classification of the occupant only upon when the consecutive period of time is greater than a threshold and then outputting the changed classification. Optionally, the classification may be reset by classifying the occupant and outputting the classification, upon detection of an empty seat as detected by the spatial sensor.

Another method for controlling output of a classification algorithm which classifies an occupant of a seat in accordance with the invention comprises initially classifying the occupant and outputting the classification, subsequently periodically classifying the occupant and enabling a change in the classification of the occupant only upon obtaining evidence of a new classification which is greater than evidence of the current classification. One time-based way in which greater evidence of a new classification than the current classification is established is by determining a consecutive period of time that the classification of the occupant is the same as the output classification, detecting a change in classification and then determining a consecutive period of time that the classification of the occupant is the changed classification, and when the period of time in which the classification is the changed classification is greater than the period of time when the classification is the output classification, outputting the changed classification.

The initial classification of the occupant may be conducted based on satisfaction of a condition such as the detection of closure of a door by, e.g., a sensor such as a door closed sensor, the detection of an empty seat by, e.g., an occupant presence sensor, weight sensor, camera and the like, and the detection of the switching on of the vehicle ignition by an appropriate sensor.

Optionally, a determination is made whether the period of time that the classification of the occupant is the same as the output classification is greater than a pre-determined time threshold relative to which changes in the current classification can be made. If so, the period of time that the classification of the occupant is the same as the output classification is set to the pre-determined threshold (which would thus be less than the period of time that the classification of the occupant is the same). This threshold thereby provides an upper limit on the amount of time needed to effect a change in the output classification. In other words, the period of time that the classification of the occupant is the same is determined and a determination is then made whether this period of time is less than or greater than the pre-determined time threshold with whichever is less being set as a comparison threshold. A period of time that the occupant is classified differently than the current classification is determined and the current classification is compared to the comparison threshold and changed only when the period of time that the occupant is classified differently is greater than the comparison threshold.

The classification of the occupant can be performed using a trained neural network such as a modular neural network, a combination neural network, and the like.

Data may be obtained from sensors such that the classification of the occupant is performed using the data obtained from the sensors. For example, data from at least one camera may be used such that the classification of the occupant is performed using the data obtained from the camera(s). The sensors may be any type which provides a signal dependent on the occupancy of the seat including, but not limited to, a weight sensor, a capacitance-based sensor, an electric field-based sensor, a radar or other electromagnetic wave-based sensor, a camera-based sensor including a 3D sensor, and an ultrasonic-based sensor. Combinations of these sensors can be used.

With respect to the classification task, once the door of the vehicle is closed, it is difficult, but not impossible, to change the occupancy of the front passenger seat, for example. On the other hand, whatever is occupying the front seat, it is possible for that occupant to take a position that fools the system, i.e., causes the system to determine a classification of the occupant that differs from the actual classification of the occupant. An adult, for example, can be in a pose that makes the system think that it is an empty seat or a child seat, or a 5% female can look like a child for some poses. On the other hand, it is difficult and unlikely that in either case that the occupant will be able to stay in that deceptive pose for very long. Thus, if the majority of the time the occupant looks like an adult, then there is no reason to change the decision even if the system momentarily thinks that the occupant is a child seat.

One-way of taking advantage of this situation is to base a new decision for the algorithm, i.e., cause the algorithm to provide an output to be acted upon, on some event such as the closing of the vehicle door. This would constitute a conditional determination by the algorithm as it would not continually provide new decisions on the classification of the occupant but would only do so when certain conditions are satisfied.

Thus, when the vehicle door is closed the system will determine the seat occupancy classification and gradually increase its confidence as more and more data sets give the same answer. For the decision to be changed would require that a similar amount of data gave a new decision. For example, let us say that the system classified the occupant as an adult for 1000 shots (about 300 seconds or 5 minutes for a slow system). To change that decision to a child seat might require a similar amount of data or 1000 shots. On the other hand, if only 10 shots came up with an adult decision followed by 11 for the child seat, the decision would be changed. The system would start over from the beginning every time it sensed an empty seat, that the door was opened, the ignition turned on or initial vehicle motion was sensed after a period of no motion. In the latter example, if the vehicle has not moved for some period of time, such as 10 minutes, then the classification system can be reset. Any one of more of these events can be used as well as a variety of other events as desired by the automobile manufacturer.

Another method for controlling output of a classification algorithm which classifies an occupant of a seat comprises the steps of setting the output classification to an empty seat, subsequently classifying any occupant of the seat, determining whether the classification is other than an empty seat and if not, periodically repeating the step, otherwise, when the classification is other than an empty seat, repeating the classification step, if the repeated classification step provides a classification of an empty seat, setting the output classification to an empty seat, if the repeated classification step provides a stable classification, then setting the output classification to the stable classification, repeating the classification step, and changing the classification only when the repeated classification step provides a classification of an empty seat in which case, the classification is changed to an empty seat.

The repeated classification steps provide a stable classification when the classification is the same for a pre-determined period of time. The classification of the occupant may be performed using a trained neural network or other pattern recognition system or even, in the case of a bladder, strain gage or other weight sensor, a simple calculation.

Accordingly, the invention restricts changes between different classification decisions by a classification algorithm, such as changes between adult decisions and child/child-seat decisions, and moreover, uses certain time-based references as reset points to allow changes in the classification decision.

In more general terms, the longer that the decision stays with a particular classification, the more difficult it is to change the classification unless some event happens such as the sensing of an empty seat, the turning on of the ignition or the opening of the door. With an optical system and using modular networks, a special network can be trained to recognize an open door, for example, or an empty seat.

Another method for controlling output of a classification algorithm which classifies an occupant of a seat entails initially classifying the occupant and outputting a current classification, subsequently periodically re-classifying the occupant, determining a consecutive period of time when the re-classification of the occupant is unchanged and different from the current classification and enabling a change in the classification of the occupant only upon when the consecutive period of time is greater than a threshold and then outputting the changed classification. The same enhancements in the above-described method can be applied in this method as well.

Still another method for controlling output of a classification algorithm which classifies an occupant of a seat in a vehicle entails initially classifying the occupant and outputting a current classification, subsequently periodically re-classifying the occupant, enabling a change in the classification of the occupant upon satisfying pre-determined criteria, resetting the classification upon detection of a condition selected from a group consisting of an empty seat, opening of a door, ignition of the vehicle, motion of the vehicle and absence of motion of the vehicle and then, upon resetting of the classification, classifying the occupant and outputting the classification. The same enhancements in the above-described method can be applied in this method as well.

For example, a change in the classification of the occupant may be enabled by determining a consecutive period of time that the re-classification of the occupant is the same as the current classification, detecting a change in classification and then determining a consecutive period of time that the re-classification of the occupant is the changed classification and when the period of time in which the classification is the changed classification is greater than the period of time when the classification is the output classification, or greater than a predetermined time period, outputting the changed classification. In the alternative, a change in the classification of the occupant may be enabled by determining whether the period of time that the re-classification of the occupant is the same as the current classification is greater than a pre-determined time threshold and if so, setting the period of time that the classification of the occupant is the same as the current classification to the pre-determined threshold.

Still another method for controlling output of a classification algorithm which classifies an occupant of a seat entails setting the output classification to an empty seat, subsequently classifying any occupant of the seat, and determining whether the classification is other than an empty seat and if not, periodically repeating the step, but otherwise, when the classification is other than an empty seat, repeating the classification step. If the repeated classification step provides a classification of an empty seat, the algorithm entails setting the output classification to an empty seat and if the repeated classification step provides a stable classification, then the output classification is set to the stable classification. The classification step is repeated and the classification is changed only when the repeated classification step provides a classification of an empty seat in which case, the classifications changed to an empty seat.

Another method for controlling classification of an occupant of a seat entails providing an empty-seat state in which a stored classification is set to an empty seat, subsequently classifying occupancy of the seat and when the classification is other than an empty seat, exiting the empty-seat state and setting the algorithm in a transition state and storing the non-empty seat classification, periodically reclassifying occupancy of the seat and changing the stored classification to the re-classified occupancy when the re-classified occupancy is different than the stored classification, determining whether the stored classification satisfies a first condition and if so, exiting the transition state and setting the algorithm in a revoking state, determining whether the stored classification satisfies a second condition different than the first condition and if so, exiting the revoking state and setting the algorithm in a classified state, and when the algorithm is in the classified state, outputting the stored classification.

In some enhanced embodiments, when the algorithm is in the classified state, the occupancy of the seat is re-classified and a change in the stored classification is prevented entirely or allowed only if the re-classified occupancy satisfies a third condition which may be a time-based condition more onerous that the second condition and the second condition is a time-based condition more onerous than the first condition.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
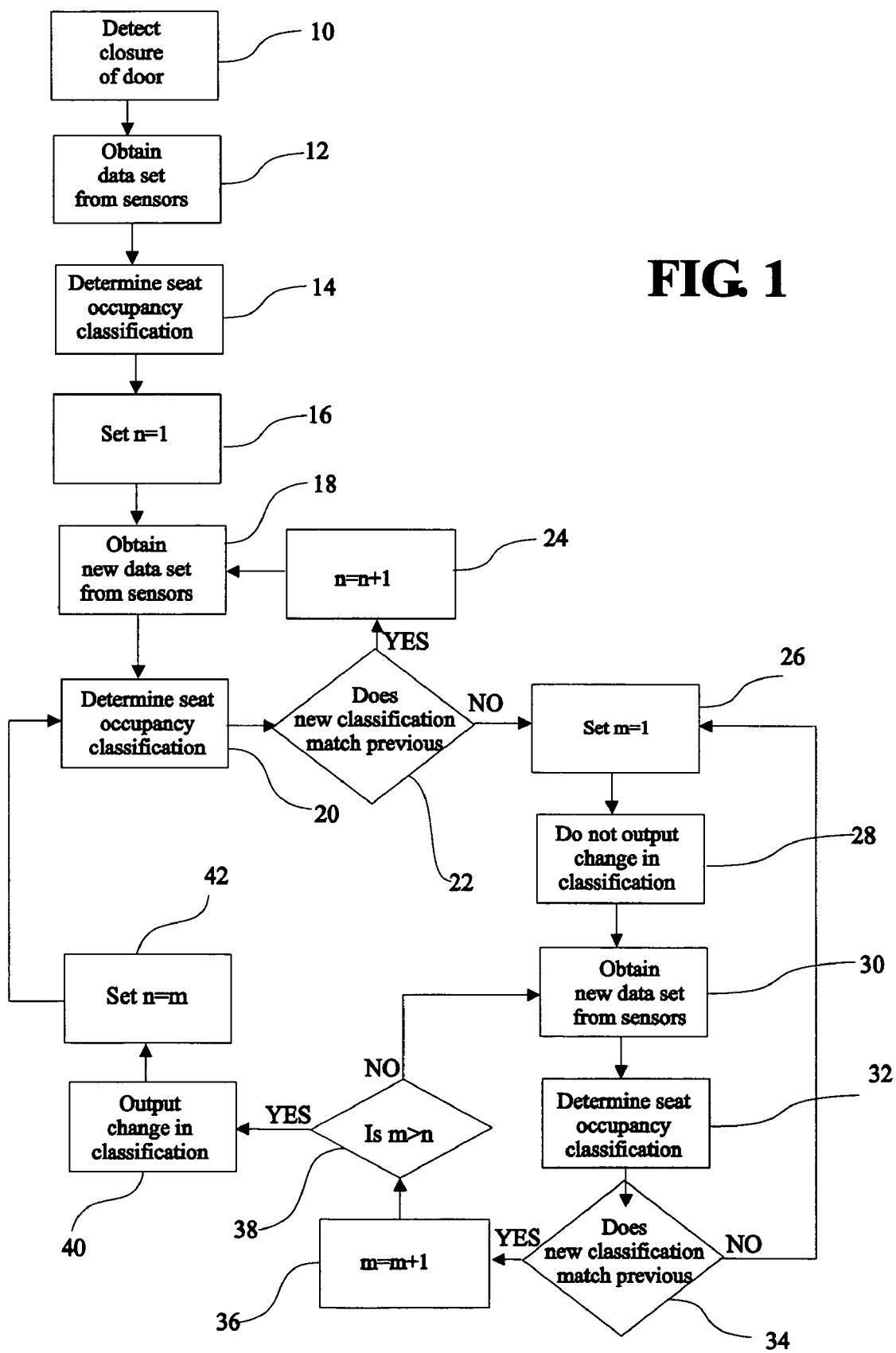
FIG. 1 is a flow chart of the manner in which one embodiment of the algorithm in accordance with the invention operates.

Referring to the accompanying drawings wherein the same reference numerals refer to the same or similar elements, FIG. 1 shows an algorithm for controlling changes in a classification process performed by a system in a vehicle which requires that the occupants of the vehicle be classified.

This algorithm functions based on the satisfaction of a condition such as closure of a door as represented at 10. When closure of the door is detected, a data set is obtained from sensors used in the classification process at 12 and the seat occupancy is determined at 14. A variable n is set to 1 at 16, this variable will be used to count the number of times the seat occupancy is classified the same. A new data set is obtained from the sensors at 18 and the seat occupancy is determined at 20. A determination is made whether the new classification is the same as the immediately previous classification at 22. If so, the variable n is increased by 1 at 24 and a new data set is obtained from the sensors at 18 and the seat occupancy is determined from the new data set at 20. Thus, the variable n will represent the number of times that data sets provide the same seat occupancy classification.

Sensors at 18 may be any type of occupant sensors including but not limited to all types of weight sensors, capacitance based sensors, electric field based sensors, radar or any other electromagnetic wave or electric field based sensors, camera based sensors including 3D sensors, ultrasonic based sensors, etc.

If the new classification is not the same as the old classification, then a variable m is set to 1 at 26. As shown at 28, the new classification is not output to components whose operation or function depends on the classification as the new classification might be erroneous, i.e., there may not be any change in occupancy of the seat but rather, the occupant may have moved. A new data set is obtained from the sensors at 30 and the seat occupancy is determined at 32. A determination is made whether the classification is the same as the immediately previous classification at 34. If so, the variable m is increased by 1 at 36. The variable m will thus represent the number of times that the data sets provided the same seat occupancy classification for the new classification.

At step 38, a determination is now made as to whether the number of times the new classification is output is greater than the number of times the previous classification was output, i.e., whether m is greater than n. If not, the new classification is not output and a new data set is obtained at 30, seat occupancy is determined at 32 from the new data set and the process continues.

When m is greater than n, it signifies that the new classification is provided by data sets more times than the previous classification, i.e., evidence of the new classification is greater than evidence of the previous classification. This is used to concretely establish a change in classification so that the new classification is output to the components and system which vary their function or operation based on the classification of the occupants (step 40). At step 42, this new classification will be used as the base classification (by setting n equal to m) and different classifications will be compared to this new classification.

Variations in this algorithm can be used to limit the time required for a change in classification, for example, by putting a maximum value on n and when this maximum value is reached, any attempt to increase n would instead result in m being decreased by 1 until m is zero. Naturally, many other algorithms can be used to accomplish this same goal of making a change of classification difficult within certain time limits. Thus, a change of classification may be permitted whenever a new classification is detected consistently for 3 minutes, for example.

It is also possible to adjust n as a function of m or vice versa, i.e., as m (the duration of the new classification) increases, n (the duration of the previous classification) could decrease. This would accelerate changes in the classification and prevent the possibility of never allowing a change in the classification. Thus, the length of time that one classification occurs would affect the time required to allow the classification to change.

For example, if the old classification lasted for 16 minutes (n=96 with a classification occurring every 10 seconds), and a new classification last for 10 seconds (m=1), the system might not change. However, as the new classification lasts for 1 minute (m=6) and then 2 minutes (m=12), n could be decreases as the probability of the new classification being accurate increases. Thus, n could be 96 for the first minute after a change in classification and then decrease by 50% for each subsequent minute after the change in classification (n=48 in the second minute, n=24 in the third minute and n=12 in the fourth minute). As such, m would be greater than n in the fourth minute and the classification would change after only three minutes.

Figure 2:
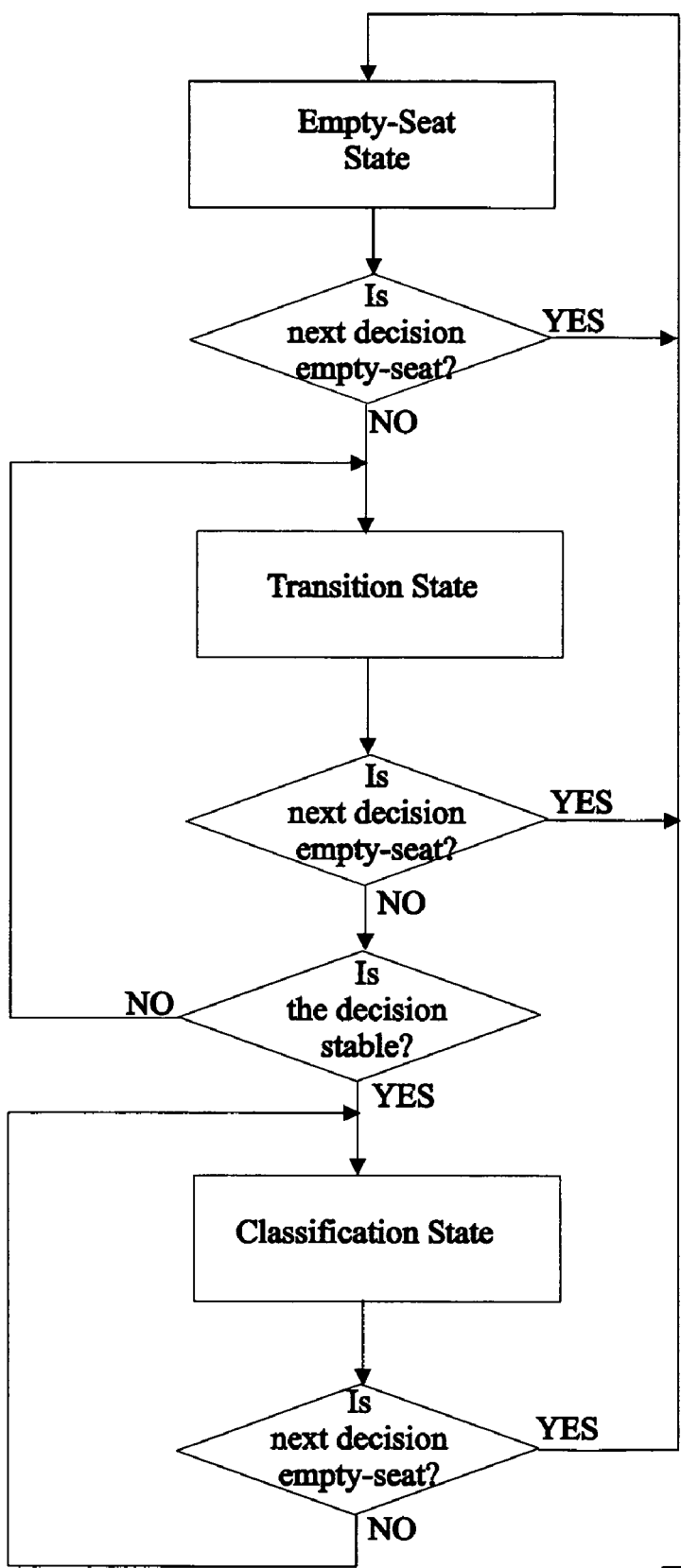
FIG. 2 is a flow chart showing the manner in which another embodiment of the algorithm in accordance with the invention operates.

Referring now to FIG. 2, in this embodiment, the algorithm does not rely on the opening and/or closing of a door. Instead, it relies on the detection of the empty seat (whether the door is opened or not). The reason is that, because of possible configuration of camera used in the classification process, it is easier to detect an empty seat than to detect an open door. On the other hand, if the system has a door closed signal input, then it would be quite easy to detect the opening and closing movements of the door.

The logic algorithm shown in FIG. 2 is added onto and is not a replacement for the feature extraction algorithm and the modular neural network algorithm. As already known, it is difficult is not impossible to make the success rate of the feature extraction algorithm and the modular neural network algorithm to be absolute 100%. There will always be weak spots or "holes". The purpose of this algorithm is to minimize the effect of these isolated weak spots. It is recommended that the neural network decisions should be filtered to remove any random noise before this algorithm is applied.

The time when the classification system is running can be considered as a sequence of 3 types of states: empty-seat state, transition state and a classified or classification state. The empty-seat state is a time period when the system decides that the passenger seat is empty. The classification state is a time period when the system decides whether the passenger seat is occupied by an adult or a child/child-seat. From an empty-seat state to a classification state, the system must pass a transition state.

The system starts or re-starts from an empty-seat state at step 44. The empty-seat state can be detected by various sensors, including one or more weight sensors arranged in connection with the seat, an electric field sensor arranged to create an electric field through the occupancy area of the seat such that the presence of an object in the seat changes the electric field sensed by the electric field sensor, or a wave-receiving sensor which receives waves from the area of occupancy of the seat.

When the decision algorithm changes at step 46, it goes into a transition state at step 48. The transition state continues until the decision made at step 50 either changes back to an empty-seat or becomes stable. If the decision changes back to empty-seat, the system goes back to an empty-seat state. If the decision becomes stable at 52, the system goes into a classification state at step 54. Once the system is in a classification state, it remains in the classification state until the decision algorithm changes to indicate an empty-seat at step 56. Then the system goes back to an empty-seat state.

An important aspect of the algorithm is that the occupancy state changes between adult and child/child-seat must be more restricted in the classification states than in the transition states.

It is necessary to have a transition state when the occupancy state changes between adult and child/child-seat which is less restricted. When an adult or a child gets into the passenger seat, it is very likely that he/she will move around doing things like adjusting the seat position, applying the seatbelt, or just putting objects in place. When people put a child seat or an infant carrier into the passenger seat, it is very likely that people will lean over to adjust the seat position, apply the restraining system such as a seatbelt, adjust the handle or shade, or just check if the baby is comfortable. During that period of time, the image pattern is very complicated and it is very difficult to train neural networks, for example, to handle all such cases. The system will toggle between classification decisions. After a while, the decisions of the algorithm will become stable. If the decisions remain constant without toggling for a certain period of time such as 10 seconds (or 5 minutes as specified by the customer), the system goes into a classification state.

Once the system is in a classification state, the occupancy state changes between adult and child/child-seat is much more restricted. This can be implemented using a filtering mechanism with long delay time.

This second embodiment overcomes some of the drawbacks of the first algorithm described above with reference to FIG. 1. Specifically, possible issues with the algorithm shown in FIG. 1 are that when the occupant moves close to a "hole", the output of the decision algorithm becomes weak and close to the threshold. As result, the decision changes back and forth. So within a short amount of time, there will be similar numbers of decisions at both classifications, and one or two new decisions can easily trigger a decision change. Further, it is difficult for the system to recover from a "hole" in that if the occupant stays in a "hole" for a very long time, it can take an equally long time for the decision to be corrected after the occupant changes back to a normal position, depending on the particular algorithm implemented. For example, if the passenger has been asleep with their feet on the instrument panel, or have a blanket covering their legs, and newspapers on the blanket for one hour, and that has been interpreted as a child seat by the system, after he/she wakes and sits up, it could take another hour for the airbag to be re-enabled depending on the particular algorithm implementation.

It is also possible to use a fixed long time period. In this case, if the decision of the decision algorithm (which is conflicting with the current classification) lasts for more than 5 to 15 minutes, for example, without toggling, the system can change the decision.

Figure 3:
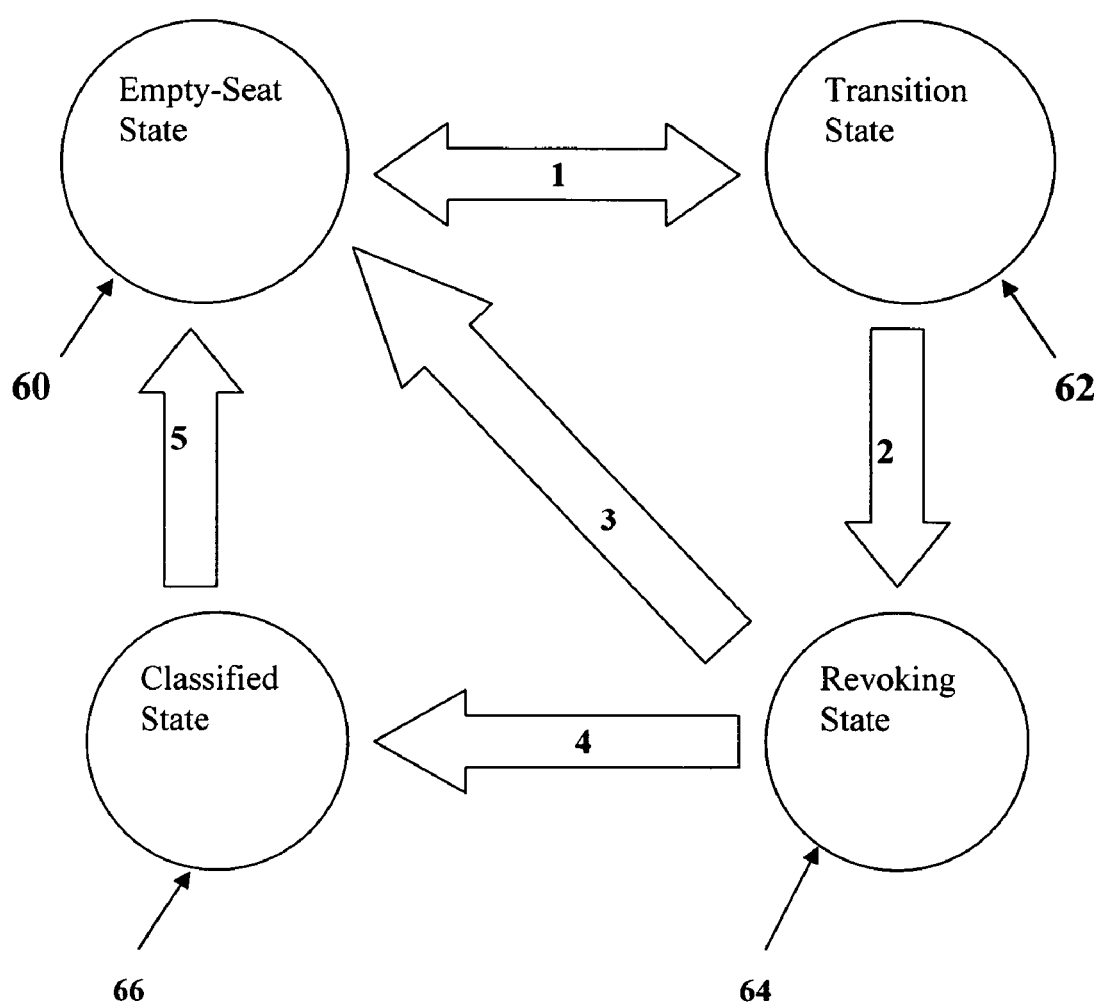
FIG. 3 is a flow chart showing the manner in which another embodiment of the algorithm in accordance with the invention operates.

Referring now to FIG. 3, in some embodiments, the time when the classification system is running can be considered as a sequence of 4 different types of states or periods: an empty-seat state 60, a transition state 62, a revoking state 64 and a classified or classification state 66. The empty-seat state 60 is a time period when the system decides that the passenger seat is empty and unoccupied (in any of the ways described above). The classification state 66 is a time period when the system decides whether the passenger seat is occupied by an adult or a child/child-seat (in any of the ways described above). From the empty-seat state 60 to the classification state 66, the system must pass both the transition state 62 and the revoking state 64. These states have the following definitions:

1. Empty-Seat State 60—Any empty-seat decision resets the system, and the system goes into the empty-seat state 60. The system or algorithm starts from the empty-seat state 60 and returns to the empty-seat state 60 every time the incoming classification is determined to be an empty-seat.
2. Transition State 62—From the empty-seat state 60, any non empty-seat decision moves the system into the transition state 62 (along the path designated 1). During the transition state 62, the system is allowed to change between any non empty-seat classifications freely. The classification obtained each time the system performs a classification is stored in a memory so that the stored classification changes freely every time the occupancy is re-classified and is different than the immediately preceding classification.
3. Revoking State 64—If the system keeps one decision (without toggling) in the transition state 62 for more than certain amount of time (or upon satisfaction of another condition not necessarily based on time, e.g., buckling of the seatbelt), the system goes into the revoking state 64 (along the path designated 2). During the revoking state 64, the system is allowed to change between any non empty-seat classifications only if the non-toggling occurrence of the new classification exceeds the non-toggling occurrence of the previous, stored classification (or evidence of the new classification is greater than evidence of the previous classification which is not required to be a time-based condition). The non-toggling occurrence of the previous, stored classification may be a consecutive length of time in which the classification is the same. If the non-toggling occurrence of the new classification is an empty-seat decision and it exceeds the non-toggling occurrence of the previous classification (or evidence of the empty-seat is greater than evidence of the previous classification which is not required to be a time-based condition), then the system changes to the empty-seat state 60 (along the path designated 3). From the revoking state 64, the system can change the stored classification to the empty-seat state 60 upon occurrence of an event, such as a change in weight applied of the seat, a determination of an empty seat by an occupant presence sensor and the like.
4. Classified State 66—If the system keeps one classification decision (without toggling) in the revoking state 64 for more than certain amount of time, the system goes into the classified state 66 (along the path designated 4) and outputs the stored classification, e.g., for use in vehicular systems. During the classified state 66, either the system is not allowed to change between any non empty-seat classifications at all, or the system is allowed to change only if the non-toggling occurrence of the new classification exceeds a large threshold. From the classified state 66, the system can change to the empty-seat state 60 upon occurrence of an event, such as a change in weight applied of the seat, a determination of an empty seat by an occupant presence sensor and the like.

A classification algorithm can thus be designed to provide the four different states and allow movement between the states as follows:

movement along path 1, from the empty-seat state 60 to the transition state 62, if the incoming classification is not an empty-seat;

movement along path 1, from the transition state 62 to the empty-seat state 60, if the incoming classification becomes empty-seat;

movement along path 2, from the transition state 62 to the revoking state 64, if the incoming classification satisfies a first condition, such as lasting more than a certain amount of time ($T_1$) without toggling;

movement along path 3, from the revoking state 64 to the empty-seat state 60, if the incoming classification becomes an empty-seat;

movement along path 4, from the revoking state 64 to the classified state 66, if the incoming classification satisfies a second condition, such as lasting more than a certain amount of time ($T_2$) without toggling (typically $T_2 \gg T_1$); and movement along path 5, from the classified state 66 to the empty-seat state 60, if the incoming classification becomes an empty-seat.

Change within the classified state 66 may be allowed only if the classification satisfies a third condition which is more onerous than the second condition, which in turn is more onerous than the first condition.

Thus, in comparison to the algorithm applying the method in FIG. 2, in an algorithm applying the method shown in FIG. 3, an additional state is provided in which changes in the classification are less restricted than in the classification state. In accordance with the invention, it is possible to introduce multiple states with varying degrees of permissibility in the changes in the classification. The permissibility for changes in the classification in each state might be time-based or based on other conditions.

In an exemplifying method for controlling output of a classification algorithm which classifies an occupant of a seat in a vehicle, the occupant is initially classified and a current classification is output. An initial threshold period of time relative to which changes in the current classification are made is set and multiple re-classifications of the occupant are conducted. A substantially consecutive period of time that the occupant has been classified or re-classified as the current classification is determined (see the loop in which a counter n is increased in FIG. 1) and also, a determination is made whether this period of time or the initial threshold is less and whichever is less is set as a comparison threshold. A substantially consecutive period of time that the occupant has been classified differently than the current classification is determined (see the loop in which a counter m is increased in FIG. 1) and the current classification is changed to this different classification only when the consecutive period of time that the occupant has been classified differently than the current classification is greater than the comparison threshold.

Thus, the current classification is changed only when certain time-dependent conditions are met. Specifically, these conditions are when the consecutive period of time that the classification of the occupant is different is greater than the consecutive period of time that the classification of the occupant was the same (the first time period which is operative in the condition m>n in FIG. 1) or greater than the pre-determined threshold (the second time period which may be a maximum value placed on n). As shown in FIG. 1, a change can be made when the number of times the occupant is classified differently than the previous classification is greater than the number of times the occupant was classified with the previous classification (the condition m>n). However, to avoid a situation where a change in occupancy would never be made because the number of times the occupant was classified with the previous classification is large, the parameter n (the number of times the occupant was classified with the previous classification) may be limited to a maximum value. As noted above, the maximum value can be 3 minutes in which case, if an occupant is classified as an adult for 20 minutes, a change in classification can be made as soon as the occupant is classified as something else for only 3 minutes (and not 20 minutes).

This embodiment of the invention also allows for a change in classification when the number of times the occupant was classified with the previous classification is less than the maximum value, i.e., if an occupant is classified as an adult for 2 minutes (less than the 3 minute threshold), and then something else for 2.5 minutes, a change in classification will be effected. The formula for enabling changes in a classification of the occupant of a vehicle depends on analysis of the consecutive number of times the occupant is classified as something other than the current classification relative to the lesser of the threshold or the consecutive number of times the occupant is classified as the current classification, whichever is less being set as the comparison threshold. Thus, if the consecutive period of time that the classification of the occupant was the same as the current classification is less than the pre-determined threshold, the comparison threshold will be the consecutive period of time that the classification of the occupant was the same as the current classification. If the consecutive period of time that the classification of the occupant was the same as the current classification is greater than the pre-determined threshold, the comparison threshold will be the pre-determined threshold.

In another embodiment of the invention described above, multiple re-classifications of the occupant are conducted and a substantially consecutive period of time that the occupant has been classified or re-classified as the current classification is determined. A threshold relative to which changes in the current classification can be made is set equal to the consecutive period of time that the occupant has been classified or re-classified as the current classification. A substantially consecutive period of time that the occupant has been classified differently than the current classification is determined and the current classification is changed depending on analysis of the consecutive period of time that the occupant has been classified differently than the current classification relative to the threshold. This threshold is adjusted as a function of the consecutive period of time that the occupant has been classified differently than the current classification. Thus, in this embodiment, a threshold relative to which changes in the current classification are made is adjusted as a function of the consecutive period of time that the occupant has been classified differently than the current classification.

Many changes, modifications, variations and other uses and applications of the subject invention will, now, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

We claim:

1. A method for controlling output of a classification algorithm which classifies an occupant of a seat in a vehicle, comprising:
   obtaining data about weight of the occupant;
   using a processor for classifying the occupant and outputting a current classification using weight data;
   conducting multiple re-classifications of the occupant using weight data;
   determining a substantially consecutive period of time that the occupant has been classified or re-classified as the current classification;
   setting a comparison threshold as the lesser of the consecutive period of time that the occupant has been classified or re-classified as the current re-classification or a pre-determined maximum time value;
   determining a substantially consecutive period of time that the occupant has been classified differently than the current classification; and
   changing the current classification only when the consecutive period of time that the occupant has been classified differently than the current classification is greater than the comparison threshold.

2. The method of claim 1, wherein the determination of the consecutive period of time that the occupant has been classified or re-classified as the current classification is made after each re-classification of the occupant when the re-classification of the occupant is the same as the current classification.

3. The method of claim 1, further comprising resetting the classification by classifying the occupant and outputting the classification, upon detection of an empty seat.

4. A method for controlling output of a classification algorithm which classifies an occupant of a seat in a vehicle, comprising:
- arranging a spatial sensor system to generate a field over a bottom cushion of the seat and in which the occupant is expected to be situated;
- obtaining data about the occupant from the spatial sensor system;
- using a processor for classifying the occupant and outputting a current classification using data about the occupant from the spatial sensor system;
- conducting multiple re-classifications of the occupant using data about the occupant from the spatial sensor system;
- determining a substantially consecutive period of time that the occupant has been classified or re-classified as the current classification;
- setting a comparison threshold as the lesser of the consecutive period of time that the occupant has been classified or re-classified as the current re-classification or a predetermined maximum time value;
- determining a substantially consecutive period of time that the occupant has been classified differently than the current classification; and
- changing the current classification only when the consecutive period of time that the occupant has been classified differently than the current classification is greater than the comparison threshold.

5. The method of claim 4, wherein the spatial sensor system includes a spatial sensor selected from a group consisting of a capacitance-based sensor, an electric field-based sensor, a radar or other electromagnetic wave-based sensor, and an ultrasonic-based sensor.

6. The method of claim 4, wherein the determination of the consecutive period of time that the occupant has been classified or re-classified as the current classification is made after each re-classification of the occupant when the re-classification of the occupant is the same as the current classification.

7. The method of claim 4, further comprising resetting the classification by classifying the occupant and outputting the classification, upon detection of an empty seat as detected by the spatial sensor system.

8. The method of claim 1, wherein the step of obtaining data about weight of the occupant comprises arranging a weight sensor in connection with the seat and obtaining data relating to the pressure exerted by the occupant on a bottom cushion of the seat from the weight sensor which is related to the weight of the occupant.

9. The method of claim 8, wherein the step of arranging the weight sensor in connection with the seat comprises arranging a bladder weight sensor in the bottom cushion of the seat.

10. The method of claim 8, wherein the step of arranging the weight sensor in connection with the seat comprises arranging a strain gage weight sensor in connection with the seat.

11. The method of claim 8, further comprising resetting the classification by classifying the occupant and outputting the classification, upon detection of an empty seat as detected by the weight sensor.

12. The method of claim 1, further comprising conducting an initial classification of the occupant based on satisfaction of a condition.

13. The method of claim 1, further comprising conducting an initial classification of the occupant based on detection of closure of a door.

14. The method of claim 1, further comprising:
- detecting an empty seat; and
- conducting an initial classification of the occupant upon detection of an object in the seat after detection of an empty seat.

15. The method of claim 1, further comprising:
- detecting switching on of the vehicle ignition; and
- conducting an initial classification of the occupant upon detection of an object in the seat after detection of the switching on of the vehicle ignition.

16. The method of claim 1, further comprising:
- providing a sensor to detect switching on of the vehicle ignition; and
- conducting an initial classification of the occupant upon detection of an object in the seat after detection of the switching on of the vehicle ignition by the sensor.

17. The method of claim 1, wherein the classifications of the occupant are performed using a trained neural network.

18. The method of claim 1, wherein the classifications of the occupant are performed using a combination neural network or a modular neural network.

19. The method of claim 1, further comprising:
- resetting the classification by classifying the occupant and outputting the classification upon detection of a condition selected from a group consisting of an empty seat, opening of a door, ignition of the vehicle, motion of the vehicle and absence of motion of the vehicle.

20. The method of claim 1, further comprising resetting the classification by classifying the occupant and outputting the classification, upon detection of a condition selected from a group consisting of motion of the vehicle and absence of motion of the vehicle.

21. A method for controlling output of a classification algorithm which classifies an occupant of a seat in a vehicle, comprising:
- using a processor for classifying the occupant and outputting a current classification;
- conducting multiple re-classifications of the occupant to obtain a tentative re-classification each time;
- after each re-classification in which the tentative re-classification of the occupant is the same as the current classification,
  - determining a substantially consecutive period of time that the occupant has been classified or re-classified as the current classification;
  - when the consecutive period of time exceeds a predetermined maximum time value, fixing the consecutive period of time that the occupant has been classified or re-classified as the current classification as the predetermined maximum time value; and
- after each re-classification in which the tentative re-classification of the occupant is not the same as the current classification,
  - determining a substantially consecutive period of time that the occupant has been classified as the tentative re-classification, and
  - changing the current classification to the tentative re-classification of the occupant only when the consecutive period of time that the occupant has been classified as the tentative re-classification is greater than the consecutive period of time that the occupant has been classified as the current classification.

22. The method of claim 21, wherein the step of classifying the occupant comprises obtaining data about weight of the occupant and classifying the occupant using weight data, the occupant being re-classified using weight data.

23. The method of claim 21, wherein the step of classifying the occupant comprises arranging a spatial sensor system to generate a field over a bottom cushion of the seat and in which the occupant is expected to be situated, obtaining data about the occupant from the spatial sensor system and classifying the occupant using data about the occupant from the spatial sensor system, the occupant being re-classified using data about the occupant from the spatial sensor system.

* * * * *